Patented Mar. 3, 1931

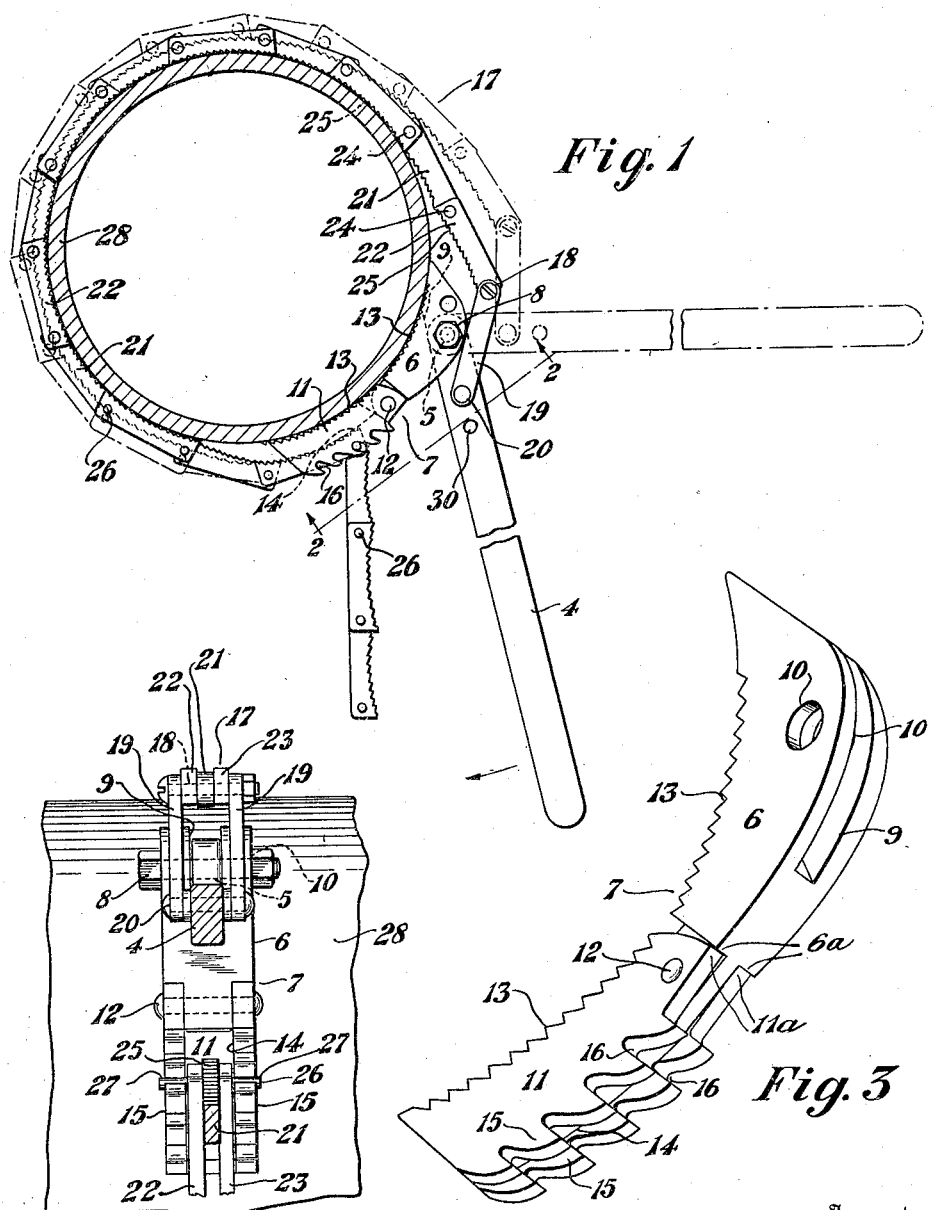

1,794,450

UNITED STATES PATENT OFFICE

MYLER DUNCAN, OF ALLIANCE, OHIO

CHAIN TONGS

Application filed May 9, 1929. Serial No. 361,663.

The invention relates to an improvement in pipe-wrenches, and belongs to that class of wrenches known as "chain tongs", for turning or holding pipe, pipe fittings, bars, fittings, or well casings and the like.

In the past, numerous wrenches of this class have been devised in which a chain encircles the pipe and is connected with a leverage system which is operated by a lever for turning the pipe. Some of the prior constructions have also included a jaw member as part of the leverage system, which contacts with the pipe at a point adjacent the operating lever, the jaw member usually being provided with teeth or a serrated surface for biting into the pipe.

In such old constructions, where great forces are necessary to be applied for twisting the pipe, the jaw member often crushes the pipe inward because of the application of great force, since such application of force only tends to tighten the chain around the pipe and draw the jaw inward into the pipe. Thus chain tongs of this character are not useful for the purpose for which they are designed because they cause a destruction of the pipe in use rather than a turning thereof.

Moreover, it is very difficult to back off chain tongs now in common use for taking a new bite because a release of the operating lever does not sufficiently loosen the chain from around the circumference of the pipe to permit the chain and jaw to be adjusted at a new position, without the necessity of entirely releasing the chain tong from the pipe, repositioning the same and again hooking the chain up. Needless to say, such tools can only be slowly and tediously used for the purpose for which they are designed.

Moreover, the only actual forces transmitted from the chain tong to the pipe for twisting the same, in using a chain tong of common construction are transmitted at the places where the chain tong jaw teeth contact or bite into the pipe. Accordingly, there is an unequal distribution of work around the periphery of the pipe in twisting the same and a larger amount of energy must be expended than is necessary for twisting the pipe because of the limited force transmitting connection between the chain tong and the pipe.

An object of my invention is therefore to provide a chain tong in which the difficulties encountered in using chain tongs of common construction are obviated; and more particularly in which the chain tong has a force transmitting connection with the pipe substantially throughout the entire circumference of the chain tong with the pipe; in which the chain tong is being applied for twisting a pipe will not cause the pipe to become crushed; in which the chain tong in being used may be quickly and easily backed off for taking a new bite; and in which the design of the various parts is extremely simple in construction, strong and durable, cheap to manufacture, and effective in operation.

These and other objects may be attained by a construction hereinafter set forth in detail, which may be stated in general terms as including a jaw having pivoted portions provided with arcuate serrated or toothed faces for contact with the pipe, an operating lever connected with the jaw, a link chain connected at one end with the operating lever, each link being provided with arcuate serrated or toothed faces for contact with the pipe, and means being provided for detachably connecting any of the links at the other end portion of the chain with the jaw.

A preferred embodiment of my invention is illustrated in the accompanying drawings, in which Figure 1 is a plan view of the new improved chain tong, the same being shown in full lines in operative position around a pipe or well casing, and the same being shown in dot-dash lines in the position which the various parts assume when the chain tong is just about to be backed off to take a new bite;

Fig. 2 is a section as on the line 2—2, Fig. 1; and

Fig. 3 is a perspective view of the pivoted jaw sections.

Similar numerals refer to similar parts throughout the drawings.

The chain tong may consist of the operating handle 4, which is pivotally mounted as at 5, to one portion 6, of the jaw 7, by means of the bolt 8.

At one portion 6, of the jaw 7, there may be provided a slot 9 along which the operating handle 4 extends, and the pivot bolt 5 is pivoted to the jaw portion 6 as by the holes 10 provided in the jaw section at the place of the slot 9.

The jaw 7 also consists of a second jaw portion 11, which is pivoted as at 12 to the first jaw portion 6, the pivotal movement of the jaw portions 6 and 11 with respect to each other being limited by the coaction of the bifurcated portions 11a and the shoulders 6a; and each jaw portion 6 and 11 is provided with an arcuate serrated or toothed face 13. The jaw portion 11 may also be provided on a portion opposite the serrated face 13, with a slot 14 extending between outwardly projecting ribs 15 having a tooth or hook contour as shown at 16, for a purpose which will be hereinafter described.

The chain tong also consists of the chain indicated generally at 17, which may be pivotally connected at one end 18, to the operating handle 4, by the links 19, which are pivoted to the operating handle as at 20.

The chain 17 consists of links 21, 22 and 23, pivotally connected to each other as at 24, and each of the links 21, 22 and 23 is provided with an arcuate serrated or toothed face 25.

It is pointed out that the arcuate face 13 of the jaw portions, and the arcuate faces 25 of the chain links all have substantially the same curvature.

The links 21, 22 and 23 at the end of the chain 17 which is not connected to the operating handle, may be pivotally connected together as by means of pins 26, which extend outward a substantial distance from the outer faces of the links 22, and 23, as shown at 27 in Fig. 2.

As shown in Fig. 2, the slot 14 in the outer surface of the jaw portion 11, has a width substantially equal to the width or thickness of the link chain 17, so that the link chain may be slidable in the slot, in order to releasably engage the outwardly extending portions 27 of the pins 26, with the hooks or teeth 16 provided in the ribs 15.

In using the chain tong for screwing up a pipe or tube such as shown at 28, the link chain 17 is placed around and encircles the periphery of the pipe, the jaw portions are engaged against the periphery of the pipe, and the pivot pin ends 27 are engaged by the hooks or teeth 16 of the jaw portion 11. The operating handle is then operated in the direction shown by the arrow in Fig. 1 of the drawings which causes the chain and jaw to tighten around the periphery of the pipe and because of the substantially continuous arcuate toothed contact between the jaw and link chain and the pipe, the pipe will be rotated or screwed in the direction shown by the arrow in Fig. 1.

When it is desired to take a new bite for further twisting or turning the pipe, the operating handle is merely rotated in the reverse direction at which time the parts assume the position shown in dot-dash lines in Fig. 1 when the chain and jaw portions may be reversely slipped around the pipe until the desired new bite position has been reached, when the operating handle will be again rotated in the direction shown by the arrow in Fig. 1 for further twisting or turning the pipe.

For allowing for increasing the slackness in the chain 17 when backing the same off to take a new bite, if the chain tong is used for twisting a pipe of larger diameter than shown in the drawings, the hole 30 is provided in the operating lever 4, by means of which the chain may be pivotally connected to the operating lever instead of at 20 as shown in Fig. 1 of the drawings.

Because the chain links and body portions have arcuate faces, there is a toothed contact between the chain tong and pipe substantially throughout the entire periphery of the pipe. Likewise, because of the pivotal connections between the links and between the portions of the jaw, the chain tong, within certain limits may be used in connection with pipes of varying diameters, in each case there being contact between the chain gong and pipe substantially throughout the periphery of the pipe.

Accordingly there is an equal distribution of the turning or twisting forces applied to the pipe throughout the entire circumference of the pipe, and the chain tong thus will not cause the pipe to become crushed.

Moreover, as is evident from an inspection of the drawings, the chain tong may be readily and easily backed off for taking a new bite without the necessity of releasing the chain tong from the pipe, repositioning the same and again hooking the chain up.

And finally, the design of the various parts is extremely simple in construction, strong and durable, cheap to manufacture, and effective in operation; and the tool may be quickly and readily used for the purpose for which it is designed.

I claim:

1. A chain tong comprising a jaw including a pair of pivoted portions, an operating handle pivoted to one portion, a link chain connected at one end to the operating handle, means detachably connecting another portion of the chain with the other jaw portion for encircling a pipe, and means limiting the pivotal movement of the jaw portions.

2. A chain tong comprising a jaw including a pair of pivoted portions, an operating handle pivoted to one portion, a link chain connected at one end to the operating handle, means detachably connecting another portion of the chain with the other jaw portion for encircling a pipe, means limiting the pivotal movement of the jaw portions, and the jaw portions and chain links each having an arcuate toothed face conforming substantially with the curvature of the pipe encircled.

3. A chain tong comprising a jaw including a pair of pivoted portions, an operating handle pivoted to one portion, a link chain connected at one end to the operating handle, means detachably connecting another portion of the chain with the other jaw portion for encircling a pipe, means limiting the pivotal movement of the jaw portions, and the jaw portions and chain links each having an arcuate toothed face conforming substantially with the curvature of the pipe encircled, said arcuate toothed faces of the jaw and links contacting with substantially the entire periphery of the pipe when encircled.

In testimony that I claim the above, I have hereunto subscribed my name.

MYLER DUNCAN.